United States Patent [19]
Johnson et al.

[11] Patent Number: 5,088,323
[45] Date of Patent: Feb. 18, 1992

[54] ACTUATOR FOR VISUAL INDICATOR

[75] Inventors: Leonard W. Johnson; Thomas C. Johnson, both of Roseau, Minn.

[73] Assignee: LTJ Enterprises, Inc., Roseau, Minn.

[21] Appl. No.: 702,364

[22] Filed: May 15, 1991

Related U.S. Application Data

[63] Continuation of Ser. No. 464,898, Jan. 16, 1990, abandoned.

[51] Int. Cl.$^5$ .............................................. G01F 23/00
[52] U.S. Cl. .................................. 73/290 R; 116/227; 340/612
[58] Field of Search ............ 73/290 R, 305, 317, 73/299; 116/110, 227, 228, 229, 270, 109; 340/612, 615, 618, 623, 625

[56] References Cited
U.S. PATENT DOCUMENTS

| | | | |
|---|---|---|---|
| 1,661,995 | 3/1928 | Brown | 73/305 |
| 2,368,589 | 1/1945 | Bierman | 73/299 |
| 2,961,842 | 11/1960 | Wright | 340/615 |
| 3,177,715 | 4/1965 | Clark et al. | 73/317 |
| 3,200,646 | 8/1965 | Donko et al. | 73/317 |
| 3,934,103 | 1/1976 | Walstra | 340/625 |
| 4,627,378 | 12/1986 | Manness et al. | 73/317 |
| 4,799,383 | 1/1989 | Johnson et al. | 73/290 R |
| 4,829,820 | 5/1989 | Johnson et al. | 73/290 R |

Primary Examiner—Thomas B. Will
Attorney, Agent, or Firm—Merchant, Gould, Smith, Edell, Welter & Schmidt

[57] ABSTRACT

An activating mechanism is disclosed for an indicator. The mechanism includes a mounting bracket which may be connected to a container. A force transmitting member is slidably received by the bracket and extends through the container wall. The actuator is collapsible to be slid through an opening formed in the container wall. Through lever action, the actuator engages and moves the force transmitting member.

10 Claims, 6 Drawing Sheets

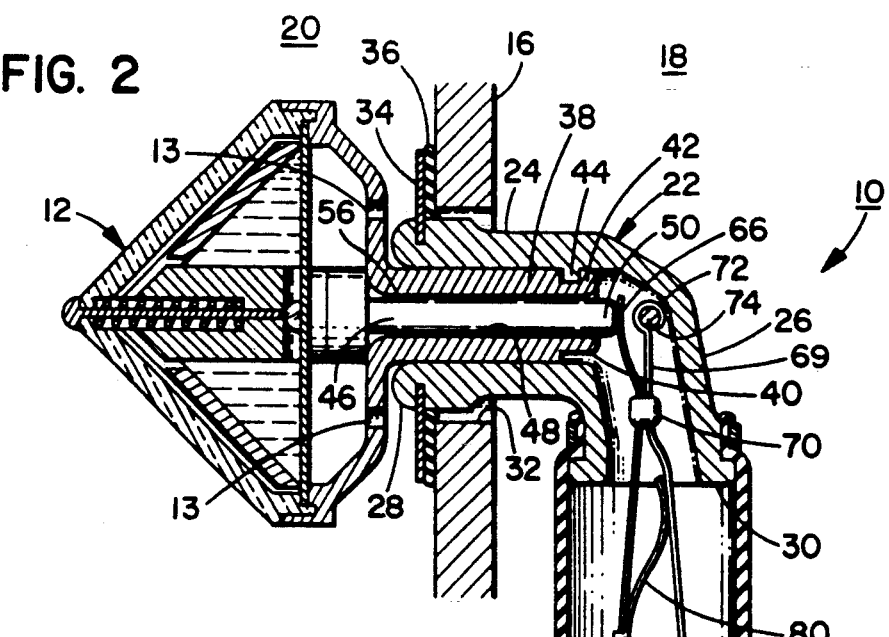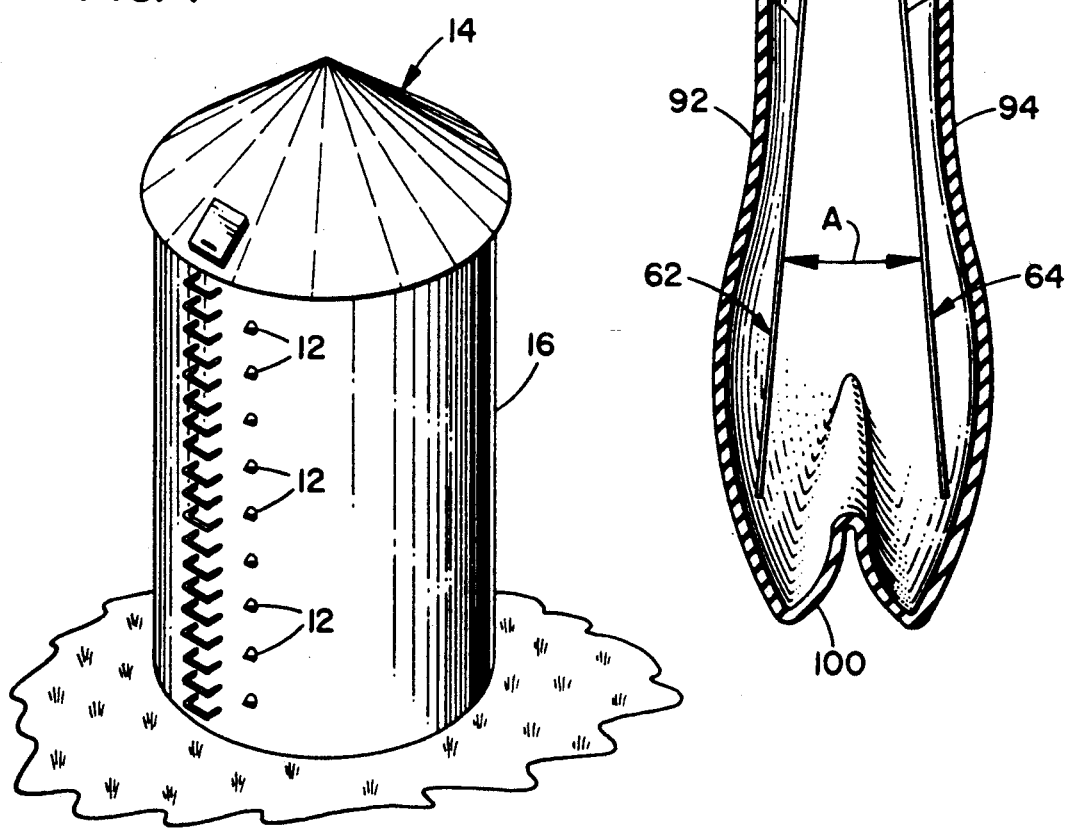

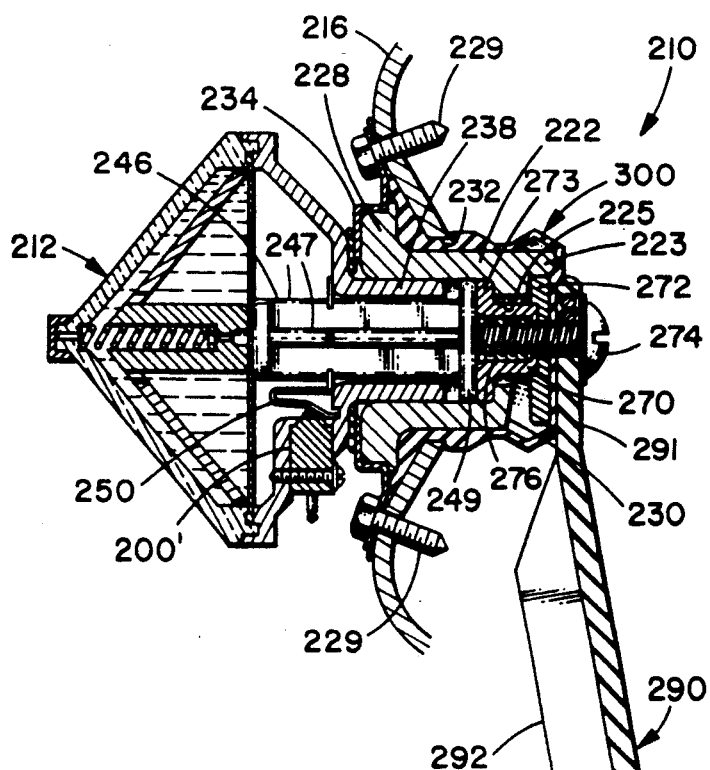
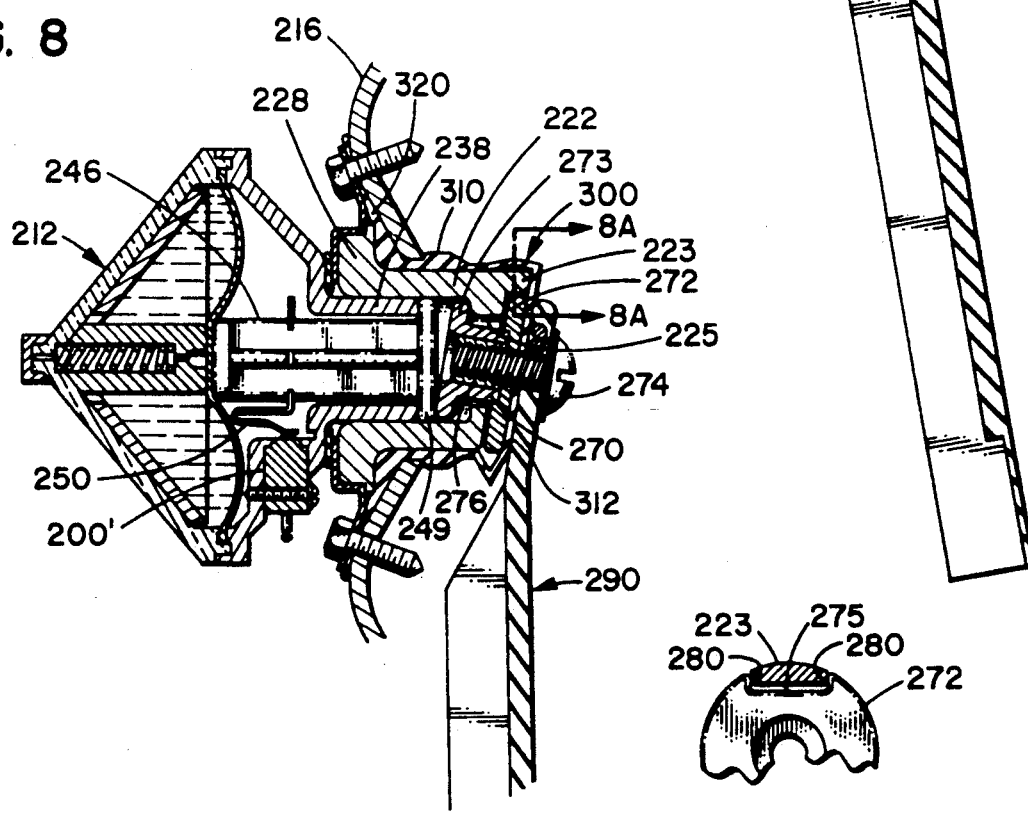

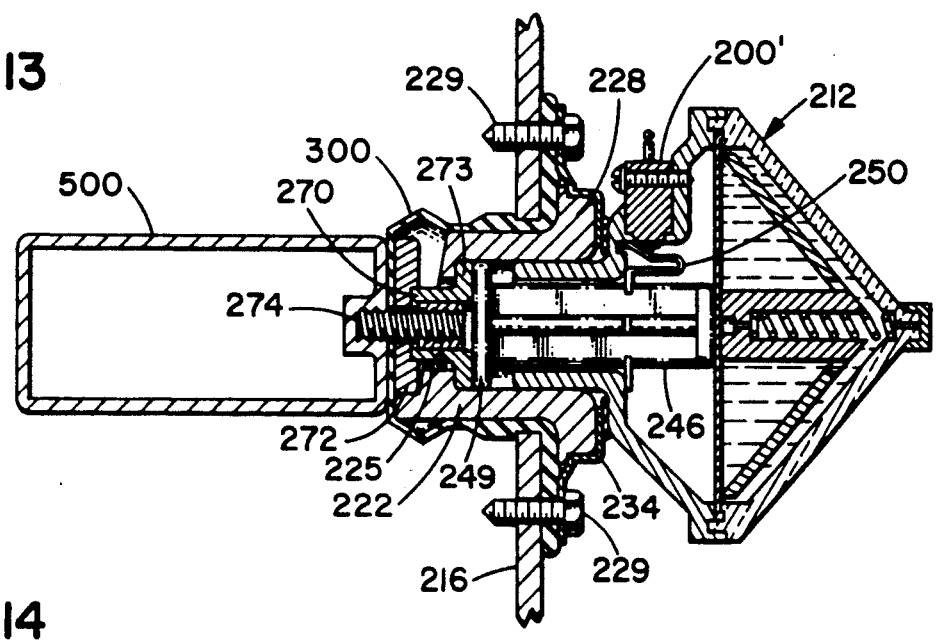
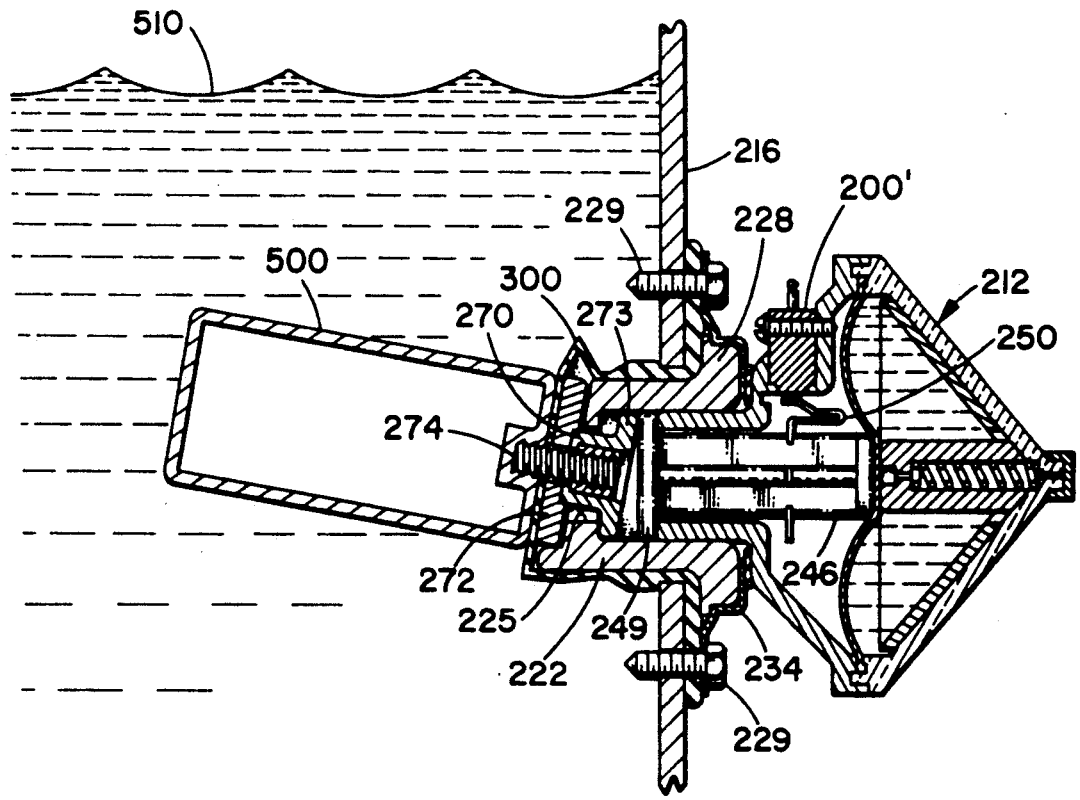

ACTUATOR FOR VISUAL INDICATOR

This is a continuation of application Ser. No. 07/464,898, filed Jan. 16, 1990, now abandoned.

BACKGROUND OF THE INVENTION

1. Field of the Invention

This application pertains to an actuator for a visual indicator. More particularly, this invention pertains to an actuator which is activated in response to a flowable medium disposed within the container.

2. Description of the Prior Art

The use of level indicators in storage tanks or holding bins is we known. For example, commonly assigned U.S. Pat. Nos. 4,829,820 and 4,799,383 disclose visual indicators for use with storage containers such as grain bins or the like. The indicator includes a member which is actuated in response to a flowable medium within the container. For example, with reference to FIGS. 4 and 5 of the aforesaid U.S. Pat. No. 4,829,820, a pressure plate 120 is pivotally mounted at a pivot point 116 to a mounting bracket. The pressure plate 120 moves in response to a material G (such as grain) within a bin. A contact 118 connected to the pressure plate 120 urges a stem 106 to be displaced in response to the presence of grain G deflecting the pressure plate 120. The movement of the stem 106 activates the visual indicator.

While the design of the indicator and actuator mechanism of the aforesaid U.S. Pat. No. 4,829,820 is satisfactory, it does have certain disadvantages. For example, the pressure plate 120 is a relatively large, flat plate which must be installed from the interior of the bin. As a result, the design of the aforesaid U.S. Pat. No. 4,829,820 is not readily susceptible to retrofitting existing grain bins. It is an object of the present invention to provide an improved actuator which will overcome the disadvantages of the prior art.

SUMMARY OF THE INVENTION

According to a preferred embodiment of the present invention, an actuating mechanism is disclosed for an indicator. The actuator includes a mounting bracket which is mounted to a container, such as a bin or the like. An opening is formed through the container with a force transmitting member slidably carried by the mounting bracket and extending through the opening. A lever switch is provided for displacing the force transmitting member in response to a medium (such as grain or the like) contained within the container.

BRIEF DESCRIPTION OF THE DRAWINGS

FIG. 1 is a perspective view of a storage container, such as a silo or storage bin, which includes a plurality of visual indicators with actuators according to the present invention;

FIG. 2 is a side elevation view, taken in section, of the indicator and actuator according to a first embodiment of the present invention;

FIG. 7 is a side elevation view, taken in section, of an indicator and actuator according to a second embodiment of the invention, with the actuator shown in a deactivated state;

FIG. 8 is the view of FIG. 7 with the actuator shown in an activated state;

FIG. 8A is an elevation view of a washer engaging a tab;

FIG. 13 is a view of the second embodiment for use in indicating a liquid level; and FIG. 14 is a view of FIG. 13 showing the actuator being activated in response to liquid level.

DETAILED DESCRIPTION OF THE PREFERRED EMBODIMENT

A. General Background

Referring now to the several drawing figures in which identical elements are numbered identically throughout, a detailed description of the preferred embodiment of the present invention will now be provided. The invention will be described in reference to a preferred embodiment where an actuating mechanism is used in a grain bin or the like for actuating a visual indicator such as that shown in U.S. Pat. No. 4,829,820. However, it will be appreciated by those skilled in the art that the actuator could be utilized in any environment to actuate any type of an indicator. For example, the actuator could be used to actuate an electronic switch.

Figure 5:
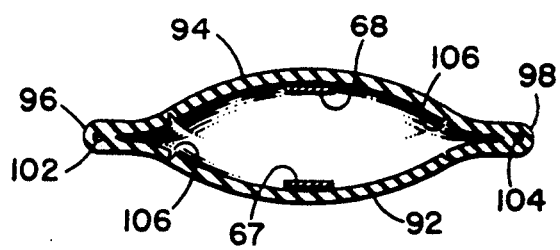
FIG. 5 is a view of FIG. 4 showing a collapsible bag deforming in response to a medium within a bin.
Figure 4:
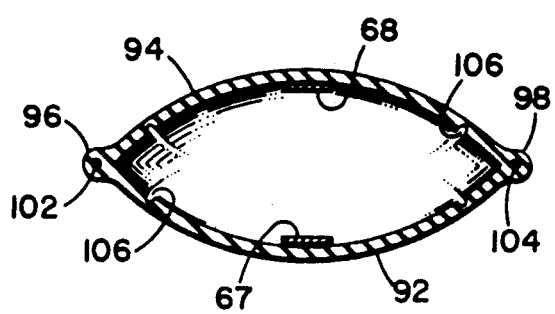
FIG. 4 is a view taken along lines 4—4 of FIG. 3.

Referring now to the various figures, the actuating mechanism of the present invention is shown in use with visual indicator 12 such as that shown in FIGS. 4 and 5 of the aforesaid U.S. Pat. No. 4,829,820. That patent, its specification and drawings are incorporated herein by reference.

The actuating mechanism is shown for use with a storage container such as a grain storage bin 14, the wall of which is shown at 16. Wall 16 separates a bin interior 18 from a bin exterior 20.

B. First Embodiment

Referring first to FIGS. 1-5, a first embodiment actuating mechanism 10 is shown. The actuating mechanism 10 includes a hollow hood 22 formed of rigid plastic material. The hood 22 has a first cylindrical portion 24 and a second cylindrical portion 26 joined at approximately right angles. First portion 24 terminates at an exterior end 28. Second portion 26 terminates at an interior end 30.

A bore 32 is formed through wall 16. For reasons that will become apparent, bore 32 is sized for the entire actuating mechanism 10 to be passed through bore 32 from exterior 20.

A mounting bracket 34 is secured to exterior end 28, with bracket 34 sized to cover bore 32. Mounting bracket 34 is secured to wall 16 through any suitable means (not shown) such as bolts, self-tapping screws or the like. Preferably, any suitable elastomeric seal 36 is positioned between mounting plate 34 and wall 16 to provide a weather-tight seal between plate 34 and wall 16. The seal also prevents outward flow of liquids or granular material from bin 14.

As shown in the drawings, the visual indicator 12 terminates at a mounting post 38 which is sized to be received within first cylinder portion 24. Post 38 terminates at a reduced diameter free end 40 having a protruding flange portion 42 extending from one side of free end 40.

Flange 42 is sized to be received upon an inwardly projecting tab 44 formed on an interior surface of first cylinder portion 24. With this arrangement, visual indicator 12 is attached to hood 22 by inserting post 38 into cylinder portion 24 and rotating post 38 until the flange 42 engages tab 44. With the tab and flange so engaged, the post 38 (and hence, visual indicator 12) is axially locked within cylindrical portion 24. To remove the visual indicator 12, the visual indicator 12 (and hence, post 38) is rotated to disengage tab 44 from flange 42. With the tab and flange disengaged, the visual indicator may be axially removed from cylinder 24.

The visual indicator 12 includes a centrally disposed stem 46 received within an axial bore 48 formed through post 38. Stem 46 terminates at a free end 50 which is exposed beyond a free end 40 of post 38. Opposing surfaces of post 38 and stem 46 define an air flow passage 56. For reasons that will become apparent, air flow passage 56 connects the interior of cylinder portion 26 with an interior of the visual indicator 12 in air flow communication. Vent holes 13 are formed in indicator 12 to avoid pressure build-up.

A lever switch 60 is provided consisting of a first switch arm 62 and a second switch arm 64. Switch arm 62 and switch arm 64 are formed from hardened spring steel in a preferred embodiment, but, to conserve costs of manufacture, could be formed from plastic or any other suitable material.

First switch arm 62 is flat pressure plate 67 which terminates at an arcuate forced transmitting end 66. Second switch arm 64 includes a flat pressure plate 68 connected to pressure plate 67 at a pivotal connection 70 such that plates 67 and 68 pivot toward and away from one another in the direction of arrow A.

Extending away from pivot connection 70 on a side thereof opposite plate 68 is an attachment plate 69 which terminates at a pivot point attachment 72. Pivot point attachment 72 is pivotally connected to a pivot pin 74, which is in turn rigidly connected to hood 22.

Shown best in FIG. 2, arcuate end 66 of first switch arm 62 arcs in a radius around pivot point 74. Due to the action of pivot point 70, as plates 67 and 68 move towards one another, forced transmitting end 66 moves away from pivot point 74 towards post 38. Similarly, as plates 67 and 68 move away from one another, forced transmitting end 66 moves towards pivot point 74.

Switch arms 62 and 64 are dimensioned for forced transmitting end 66 to oppose free end 50 in force transmitting relation. As a result, when forced transmitting end 66 moves away from pivot point 74, forced transmitting end 66 urges stem 46 to move into visual indicator 12 and actuate the indicator.

A leaf spring 80 is provided disposed between plates 67 and 68 urging the plates apart to act as a controlled separation for plates 67 and 68 to urge forced transmitting end 66 toward pin 74. With forced transmitting end 66 urged toward pin 74, stem 46 is free to follow and move out of the visual indicator 12 to thereby deactivate the visual indicator 12.

A flexible collapsible bag 90 is provided secured to end 30 and enclosing pressure plates 67 and 68. The bag 90 creates an air-tight seal between granular material (or other flowable material, such as liquids) contained within bin 14 and the activating mechanism 60.

Preferably, bag 90 is formed of molded synthetic rubber and includes first and second halves 92, 94 joined by side seams 96, 98. A pleated bottom seam 100 seals the bottom of bag 90. Bag halves 92, 94 are sized to present a cross-sectional area significantly greater than the surface area of plates 67, 68. However, bag 90 is also selected so that it may be folded and passed through bore 32.

Side edges 96, 98 are provided with a metal wire core 102, 104, to prevent stretching of the bag 90 in response to the weight of granular or other flowable medium acting against the bag. Interior surfaces of bag halves 92, 94 are provided with reliefs 106 so the bag halves 92, 94 can collapse easily toward one another or expand away from one another in response to the pressure of granular or other flowable medium, or spring 80, respectively.

The bag 90 is free to collapse in response to the urging of bulk material within bin 14 to collapse onto both pressure plates 67 and 68, and urge the plates together in response to the granular or other flowable material within bin 14.

The actuating mechanism 10 as described is particularly suitable in retrofitting existing grain bins for use with visual indicators such as visual indicator 12. The pressure plates 67 and 68 and the bag 90 may be collapsed by the operator such that their cross-sectional area is smaller than the area of mounting plate 34. As a result, when retrofitting an existing bin, an operator need only cut a hole 32 within a bin wall 16 large enough to pass mechanism 10 yet be covered by plate 34. With the hole 32 thus cut, the entire mechanism can be slipped through the hole 32 without requiring an operator to obtain access to the interior of bin 14. This has significant advantages over the prior art design, which has an enlarged pressure plate that is not readily collapsible and requires an operator to have personal access to the interior of the bin 14.

With the actuating mechanism 10 installed as shown in FIGS. 1-5, the bag surfaces present an enlarged surface area relative to the pressure plates 67 and 68. As a result, greater force acts on pressure plates 67 and 68 than would be available in the absence of a large surface area of the bag 90. Namely, the presence of granular or other flowable material in bin 14 causes the bag surfaces to collapse upon themselves, and thereby have the entire force acting on the area of the bag now acting on the reduced area of the pressure plates 67 and 68, urging them to close and thereby force stem 46 into visual indicator 12 to activate the visual indicator. The bag is collapsed regardless of which side of the bag is exposed to pressure from granular or other flowable material. As the flowable material (such as grain, flour or the like, or any liquid) flows out of bin 14, the weight of the material is no longer acting against bag 90 and the spring 80 can force pressure plates 67 and 68 apart to permit stem 46 to follow forced transmitting end 46 and deactivate the visual indicator 12.

Figure 6:
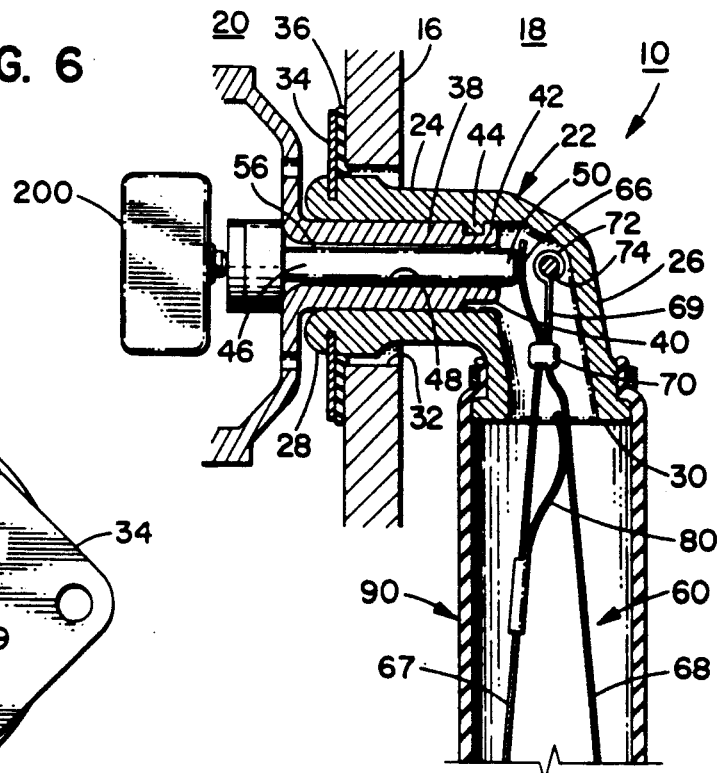
FIG. 6 is a side elevation view, taken in section, showing the actuator of the present invention in combination with an alternative indictor mechanism.
Figure 3:
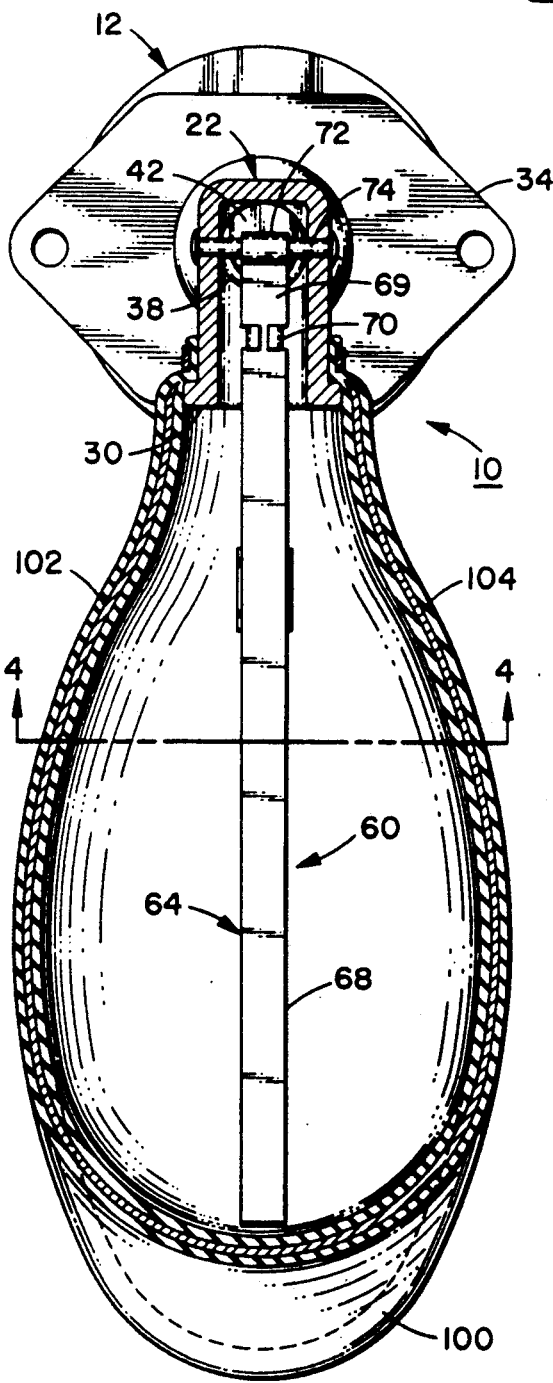
FIG. 3 is a rear plan view, partially in section, showing the actuator of the present invention.

The foregoing detailed description of the present invention has been shown with reference to a preferred embodiment using the visual indicator 12 such as that shown in U.S. Pat. No. 4,829,820. However, there is no need for the actuating mechanism 10 to be limited to such an embodiment. For example, the actuating mechanism 10 could have the stem 46 attached to an electrical switch 200 to operate an electrical indicator. Such an embodiment is schematically shown in FIG. 6.

C. Second Embodiment

With reference now to FIGS. 7-12, a second embodiment of a collapsible actuator is shown. In FIGS. 7 and 8, the wall 216 of the bin is shown as being corrugated to illustrate the flexibility of the design of the second embodiment. An opening 232 of known dimension is formed through the wall 216.

A visual indicator 212 is shown, and is a visual indicator such as that shown in U.S. Pat. No. 4,829,820. A hollow hood 222 is shown extending through hole 232 and is used for connecting visual indicator 212 to a mounting bracket 234. The hood 222 is hollow and generally cylindrical, and includes exterior flange 228. Mounting bracket 234 is pressed against flange 228 and is secured to corrugated wall 216 by sheet metal screws 229. An interior axial end 230 of hood 222 has a flat face which is set at a slight angle to the axis of hood 222. At an upper end of face 230 (as viewed in FIG. 7), a tab 223 extends outwardly from face 230.

The visual indicator 212 includes a cylindrical mounting post 238 which is sized to be received within the interior of hood 222. Any suitable locking mechanism (not shown) can be provided for locking mounting post 238 within hood 222. An example of a locking mechanism is cooperating tab 44 and flange 42 as shown in FIG. 2 of the first embodiment of the present invention.

A stem 246 is provided extending from indicator 212 into the interior of hood 222. The stem 246 includes a plurality of radial ribs 247 with the stem 246 being slidably received within mounting post 238. Stem 246 terminates at a pressure plate 249. The plate 249 prevents over-exertion of force on visual indicator 212.

Axial movement of stem 246 activates the actuator 212 in the manner indicated in U.S. Pat. 4,829,820. Additionally, axial movement of the stem 246 can be used to activate an electrical switch 200, As shown in FIGS. 7 and 8, a strip 250 of spring steel is provided and carried on stem 246. Movement of stem 246 causes strip 250 to act in a camming action to operate electrical switch 200'.

An actuator 210 is provided for causing the axial movement of stem 246. The actuator 210 includes a collapsible plate 290 connected to a force transmitting cup 270 and a motion restriction washer 272. A bolt 274 and threaded insert 276 are provided for connecting the pressure plate 290 to the washer 272 and cup 270.

The cup 270 is sized to be received within hood 222. As shown in FIGS. 7 and 8, the hood 222 includes a reduced diameter portion 225. Cup 270 is sized to be slidable received within portion 225 and be tilted between coaxial alignment shown in FIG. 7 and the position in FIG. 8 with the axis of cup 270 tilted downward relative to the axis of hood 222. A flanged end 273 retains cup 270 within hood 222, with flange 273 acting against pressure plate 249. As shown in FIG. 7, when the cup 270 is in coaxial alignment with stem 246, the visual indicator 212 is in an inactivated state. When the cup 270 is tilted to the position shown in FIG. 8, the flange 273 acts as a lever with a top end of flange 273 acting against the material of hood 222 and the bottom portion of flange 273 pressing against stem 246 to urge the stem into indicator 212 to thereby activate indicator 212.

Figure 12:
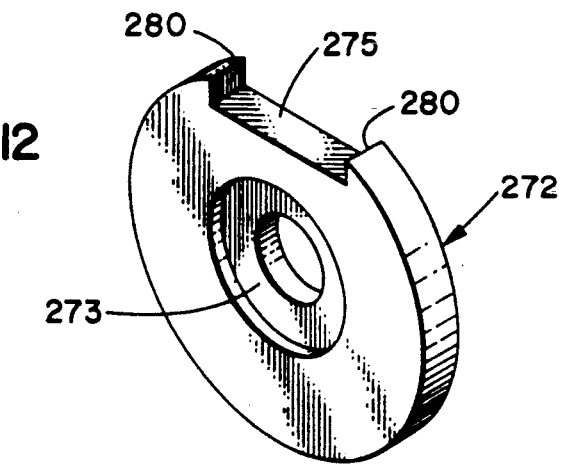
FIG. 12 is a view of a washer for use with the present invention.

As indicated, cup 270 is connected to pressure plate 290 by a threaded insert 276 which cooperates with a threaded bolt 274. A washer 272 is carried between cup 270 and pressure plate 290. The washer 272 acts to prevent undesired rotation of pressure plate 290 about the axis of the bolt 274. The washer is best shown in FIGS. 8A and 12 and includes an axial recess 273 sized to receive cup 270. An upper edge of washer 272 is provided with a cut-in notch 275. Notch 275 is sized to receive tab 223. As a result, the surfaces 280 of washer 272 defining notch 275 oppose tab 223 and will abut tab 223 to prevent undesired rotation of the pressure plate 290.

A flexible rubber boot 300 is provided having a cup-shaped body 310 completely surrounding hood 222 with a face 312 of the boot 300 extending between washer 272 and pressure plate 290. A flanged end 320 of boot 300 extends between the mounting bracket 234 and the exterior of corrugated wall 216 to provide a weather-tight seal between mounting bracket 234 and wall 216. The boot also prevents outward flow of liquid or granular material from the bin.

Figure 9:
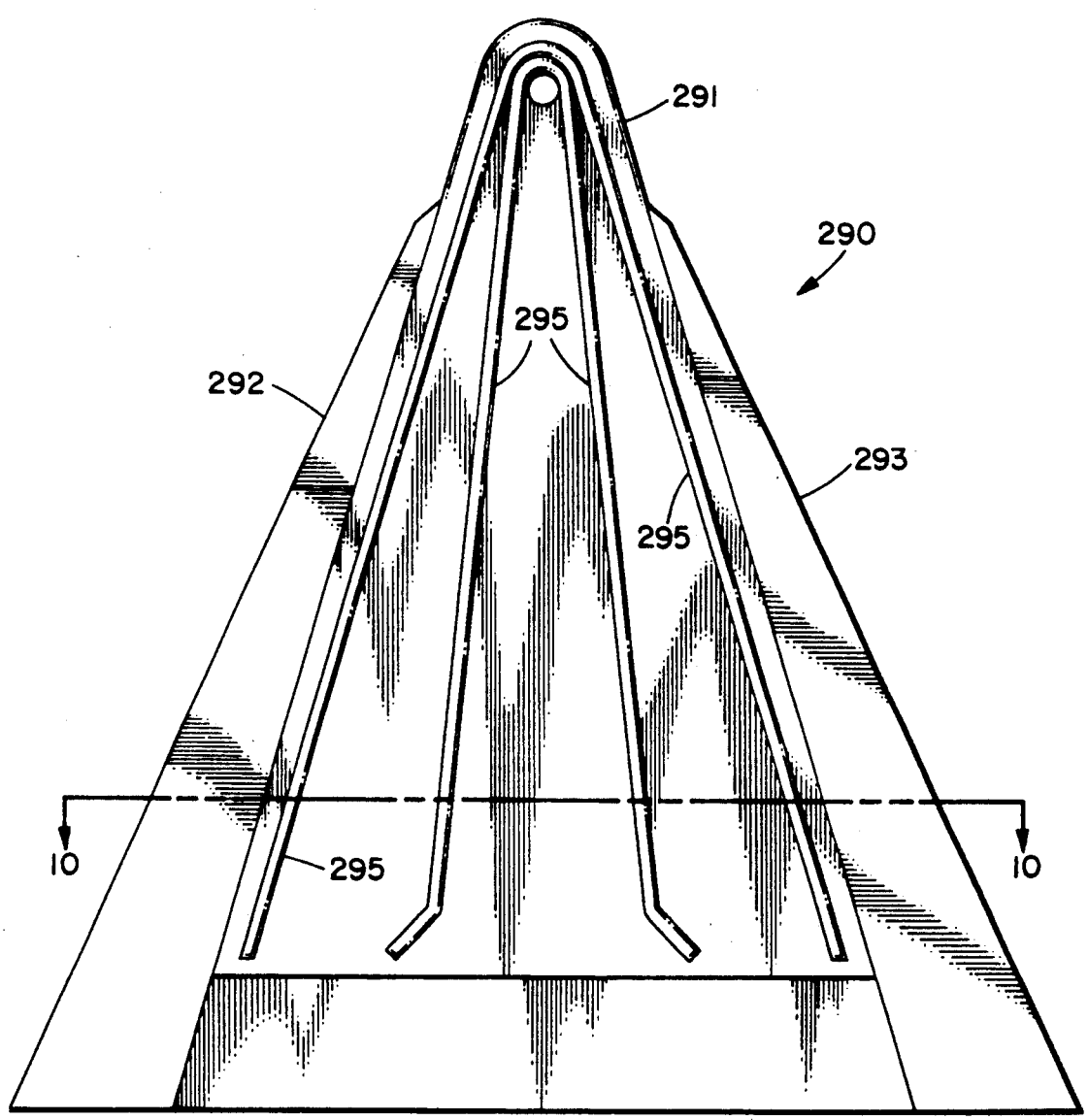
FIG. 9 is a front elevation view of the actuator of FIG. 7.
Figure 10:
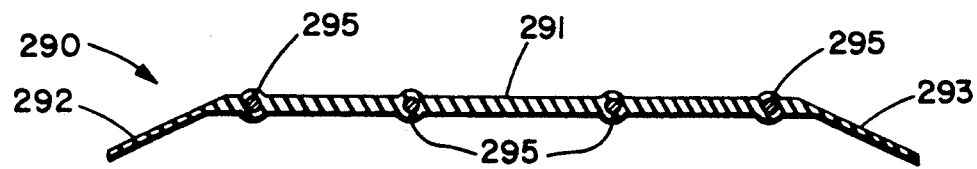
FIG. 10 is a view taken along lines 10—10 of FIG. 9.

The pressure plate 290 is best shown in FIGS. 9 and 10, and includes a generally flat triangular-shaped body 291 with side flaps 292, 293. In FIGS. 9 and 10, pressure plate 290 is shown in its relaxed state, with flaps 292, 293 angled inwardly toward wall 216 to deflect material which may be loaded into the bin 14. As flowable material is loaded into the container, the flaps 292, 293 flex toward the bin wall and prevent flowable material from flowing behind the pressure plate 290 before the indicator 212 is in the actuated position. The pressure plate 290 is angled to prevent the pressure plate from deactivating as flowable material covers the pressure plate and settles or flows downwardly past the pressure plate.

Preferably, pressure plate 290 is formed of resilient rubber such that an operator may grasp plate 290 and squeeze it into a collapsed shape sized to be received through hole 232. The resiliency of the synthetic rubber material of pressure plate 290 causes the plate 290 to expand to its rest position (shown in FIGS. 9 and 10) once inserted into the interior of the bin. To assist the resilient material of pressure plate 290 and urge the pressure plate 290 to its rest position, spring steel wires 295 are provided molded into the material of 290 to urge the material of 290 to its rest position.

Figure 11:
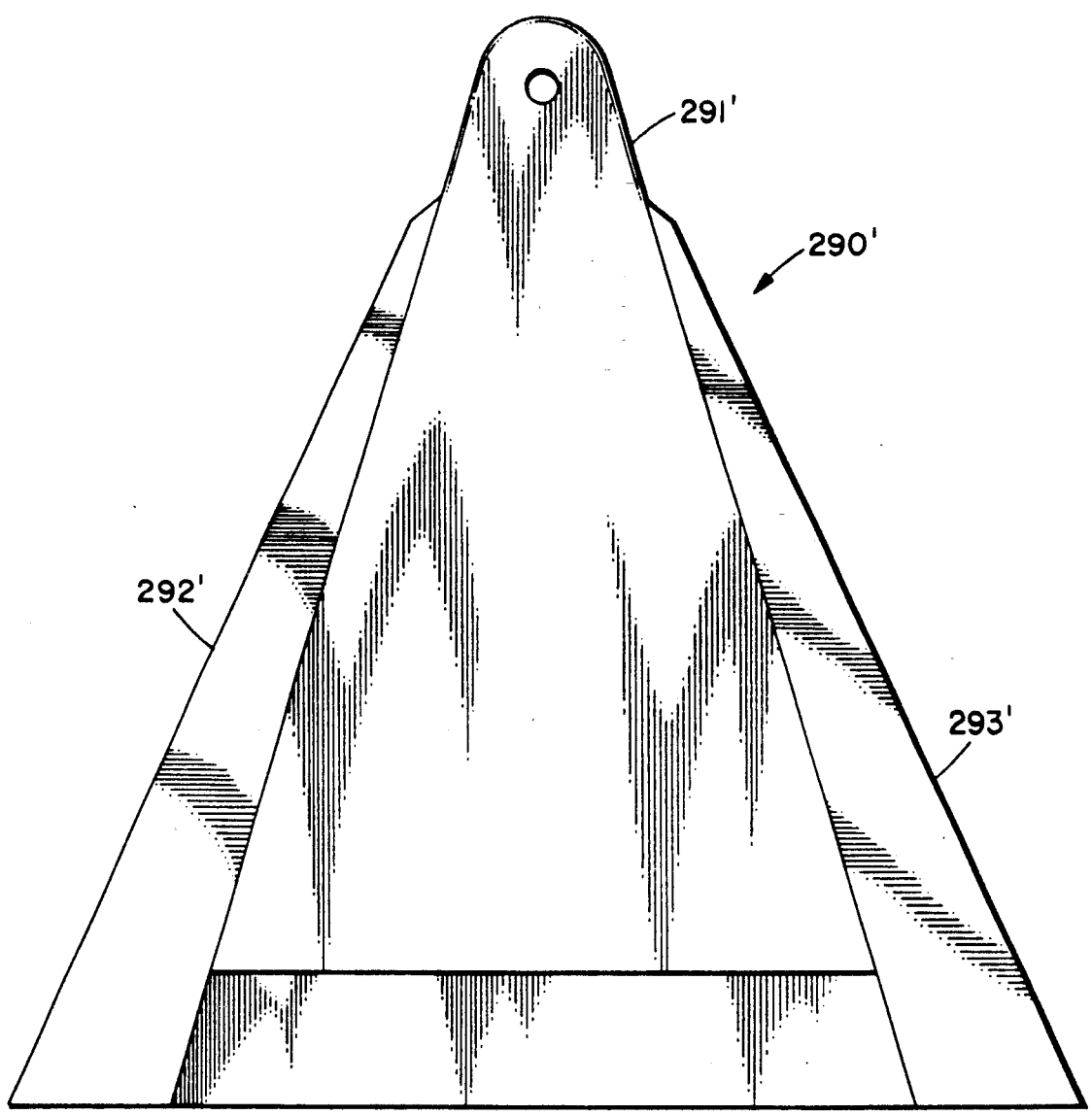
FIG. 11 is a view of FIG. 9 showing a modified version of the actuator.

It will be appreciated that the spring steel wires 295 are preferred, but not necessary. For example, FIG. 11 shows a modified version of pressure plate 290 with the modified version 290' formed entirely of resilient synthetic rubber, without the use of imbedded spring steel wires.

D. Embodiment for Use with Liquids

FIGS. 13 and 14 show a modified embodiment of the actuator of FIGS. 7 and 8 for use with a bin containing liquids. In FIGS. 13 and 14, the pressure plate 290 of FIGS. 7 and 8 has been replaced with a float 500. Also, the hood 222 and washer 272 in FIGS. 13 and 14 has been rotated 180 degrees from the position of FIGS. 7 and 8. In all other respects, the mechanisms of FIGS. 13 and 14 is identical to that of FIGS. 7 and 8. Accordingly, identical numbers are carried over.

As shown in FIGS. 13 and 14, hood 222 and washer 272 are rotated 180 degrees. As a result, the float 500 can tilt up from the horizontal position shown in FIG. 13 to a slightly inclined position shown in FIG. 14. The buoyancy of the float 500 in response to a liquid level 510 results in the cup 270 being angled (as shown in FIG. 14) to activate the visual indicator 212 or switch 200'.

From the foregoing detailed description of the present invention it has been shown how the objects of the invention have been obtained in a preferred manner. However, modifications and equivalents of the disclosed concepts, such as those which readily occur to those skilled in the art, are intended to be included within the scope of this invention. Thus, the scope of this invention is intended to be limited only by the scope of the claims which are, or which may hereafter be, appended hereto.

What is claimed is:

1. An actuating mechanism for a material lever indicator, said mechanism comprising:
   a mounting bracket for mounting to a container having an opening extending between a container interior and a container exterior, said opening being of predetermined dimensions;
   a force transmitting member coupled to said material level indicator and slidably connected to said bracket;
   an actuator having means for collapsing said actuator to a collapsed size sized to be extended through said opening, with said actuator having a rest size greater than said collapsed size and having means for pivotally connecting said actuator to said bracket for said actuator to pivot in response to a force of a material contained within said container, and with said actuator coupled to said force transmitting member to displace said force transmitting member in response to movement of said actuator;
   said actuator including a lever switch for displacing said member in response to a material contained in said container, said switch including a first switch arm and a second switch arm pivotally connected at an intermediate pivot point;
   said lever switch connected to said bracket with said first switch arm presenting a contact end opposing said force transmitting member inn force transmitting relation;
   whereby said material within said container urges said first and second arms together to pivot about said pivot point with said contact end urging said force transmitting member to become displaced, and thereby actuate said indicator.

2. An actuating mechanism according too claim 1 wherein said second lever arm is pivotally connected to said bracket, and said contact end is dimensioned to oppose said force transmitting member when said lever switch is pivoted about said axis in any one of a plurality of positions.

3. An actuating mechanism according to claim 1 comprising a flexible collapsible enclosure surrounding said lever switch and connected to said bracket.

4. An actuating mechanism according to claim 1 comprising means for urging said lever arms apart.

5. An actuating mechanism according to claim 1 comprising means for preventing rotation of said actuator relative to said mounting bracket.

6. An actuating mechanism for an indicator, said mechanism comprising:
   a mounting bracket for mounting to a container having an opening extending between a container interior and a container exterior, said opening being of predetermined dimensions;
   a force transmitting member coupled to said indicator and slidably connected to said bracket;
   an actuator having means for collapsing said actuator to a collapsed size sized to be extended through said opening, with said actuator having a rest size greater than said collapsed size and having means for pivotally connecting said actuator to said bracket for said acuator too pivot in response to a force of a material contained within said container, and within said actuator coupled to said force transmitting member to displace said force transmitting member in response to movement of said actuator;
   said actuator including a pressure plate formed of resilient material collapsible to a first state sized to pass through said opening and resilient to expand from said collapsed state to an expanded state.

7. An actuating mechanism according to claim 6, wherein said pressure plate is a plate of resilient synthetic rubber.

8. An actuating mechanism according to claim 7, wherein said actuating mechanism includes spring means molded within said rubber for urging said rubber to expand from said collapsed state to said expanded state.

9. An actuating mechanism according to claim 6 comprising means for preventing rotation of said actuator relative to said mounting bracket.

10. An actuating mechanism according to claim 7 wherein said actuator includes resilient flaps angled to deflect flowable medium from flowing between said actuator and said container.

* * * * *